United States Patent
Oliver et al.

(10) Patent No.: US 7,480,971 B2
(45) Date of Patent: *Jan. 27, 2009

(54) METHOD AND DEVICE FOR MOUNTING A FASTENER ELEMENT ON A PART, PARTICULARLY A SHEET METAL PART

(75) Inventors: Diehl Oliver, Bad Homburg (DE); Richard Humpert, Rosbach (DE)

(73) Assignee: Profile Verbindungstechnik GmbH & Co., KG (DE)

( * ) Notice: Subject to any disclaimer, the term of this patent is extended or adjusted under 35 U.S.C. 154(b) by 55 days.

This patent is subject to a terminal disclaimer.

(21) Appl. No.: 11/568,249

(22) PCT Filed: Apr. 28, 2005

(86) PCT No.: PCT/EP2005/004589
§ 371 (c)(1),
(2), (4) Date: Mar. 28, 2007

(87) PCT Pub. No.: WO2005/105365
PCT Pub. Date: Nov. 10, 2005

(65) Prior Publication Data
US 2007/0214624 A1   Sep. 20, 2007

(30) Foreign Application Priority Data
Apr. 28, 2004   (DE) ................ 10 2004 020 675

(51) Int. Cl.
*B23P 23/04* (2006.01)
*B21J 9/02* (2006.01)
*B21J 5/12* (2006.01)
*F16B 37/06* (2006.01)

(52) U.S. Cl. ............... 29/33.5; 29/514; 29/432.1; 411/176; 411/180

(58) Field of Classification Search ........... 29/33.5, 29/243.5, 432.1, 505, 509, 514, 521, 524.1, 29/525.06, 525.11; 411/29, 34, 134, 176, 411/180, 378, 383, 384, 501; 72/125, 126, 72/452.4
See application file for complete search history.

(56) References Cited

U.S. PATENT DOCUMENTS 1,087,281 A   3/1914   Snodgrass et al.

(Continued)

FOREIGN PATENT DOCUMENTS

DE   512 924   11/1930

(Continued)

OTHER PUBLICATIONS

International Search Report for PCT/EP05/004589.

(Continued)

*Primary Examiner*—Dana Ross
(74) *Attorney, Agent, or Firm*—Hunton & Williams LLP; Eugene C. Rzucidlo

(57) ABSTRACT

Disclosed are a method and a device for mounting a fastening element (12) to a part (13), e.g. a sheet metal part, said fastening element comprising a head piece (14) with a tubular rivet section (16) which is disposed concentric to an axis of symmetry (18) of the fastening element (12) or a fastening section (20) of the fastening element (12) and extends into the head piece via a radially extending contact surface (22). The rivet section (16) is guided through the part (12) so as to form a hole in said part, and the rivet section (12) is flanged such that the part is clamped between the contact surface and the flanged rivet section in the area of the hole. The inventive method and device are characterized in that the part is placed above a rivet matrix, and the rivet section is pressed through the part and is then flanged by applying a local force to the head piece of the fastening element, said force moving in circles about the central axis of symmetry, or by applying such a force to the matrix while performing a relative axial advancing movement between the tool applying said force and the matrix.

13 Claims, 12 Drawing Sheets

U.S. PATENT DOCUMENTS

Figure 1A:
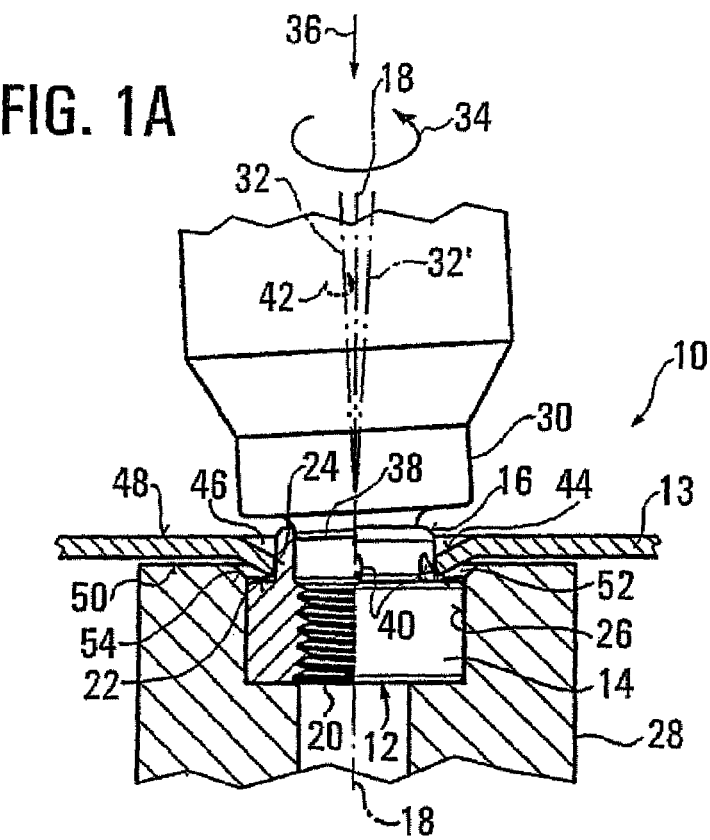

| | | | |
|---|---|---|---|
| 1,517,079 | A | 11/1924 | Langton |
| 1,787,076 | A | 12/1930 | Kalgren |
| 2,729,884 | A | 1/1956 | Mautone |
| 2,739,726 | A | 3/1956 | Bregen |
| 2,771,207 | A | 11/1956 | Ott |
| 4,459,840 | A | 7/1984 | Francis |
| 4,555,838 | A * | 12/1985 | Muller ...................... 29/432.1 |
| 4,974,274 | A | 12/1990 | Compton et al. |
| 5,335,411 | A * | 8/1994 | Muller et al. ................. 29/512 |

FOREIGN PATENT DOCUMENTS

| | | |
|---|---|---|
| DE | 42 13 421 C2 | 10/1993 |
| DE | 197 41 562 A1 | 3/1999 |
| DE | 199 45 743 A1 | 4/2000 |
| DE | 199 27 103 A1 | 12/2000 |
| DE | 100 17 462 A1 | 10/2001 |
| DE | 100 61 635 A1 | 6/2002 |
| DE | 101 02 712 A1 | 8/2002 |
| EP | 0 539 793 | 5/1993 |
| EP | 1 116 891 B1 | 11/1995 |
| JP | 07 171 651 | 7/1995 |
| SE | 521 812 C2 | 12/2003 |
| SU | 812 413 | 3/1981 |
| WO | WO 00/76688 | 6/2000 |
| WO | WO 03/029667 | 4/2003 |

OTHER PUBLICATIONS

German search report of Feb. 14, 2005 corresponding to German Patent Application No. 10 2004 020 675.9.

English language translation of German search report of Feb. 14, 2005 corresponding to German Patent Application No. 10 2004 020 675.9.

Wossner, Johannes: Mit Taumelbewegung clincht es sich leichter. Industrieanzeiger Aug. 1999, pp. 62 and 63.

Wossner, Johannes et al.: Durchsetzfugen—taumelnd geht es leichter. Technische Rundschau, No. 10, 1999, pp. 62 and 63.

* cited by examiner

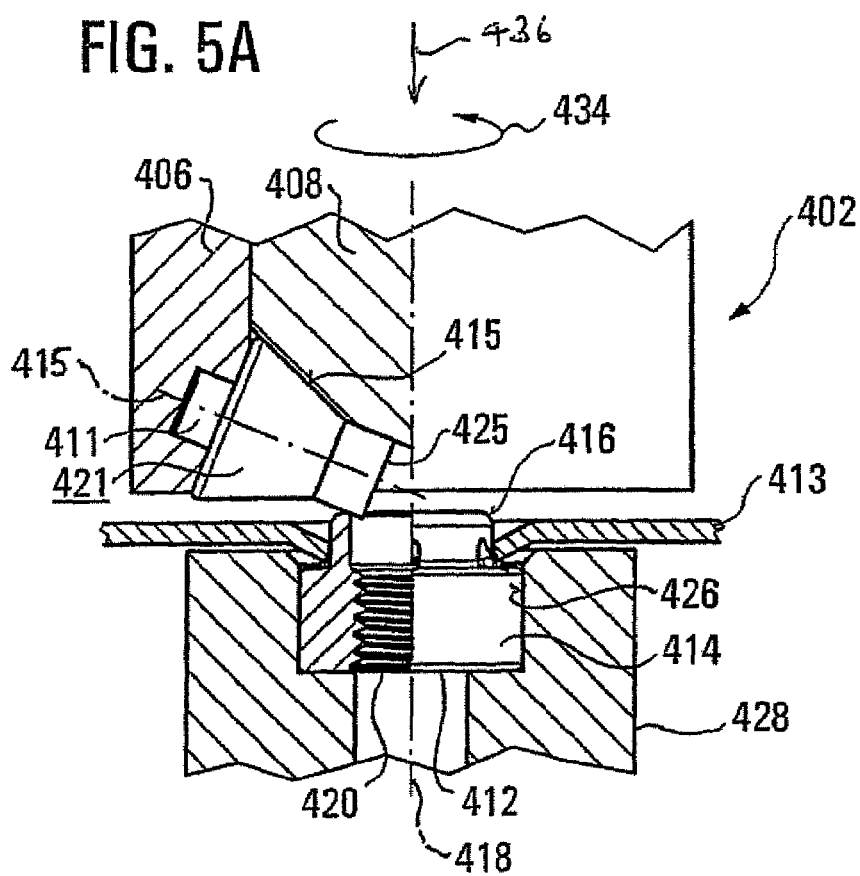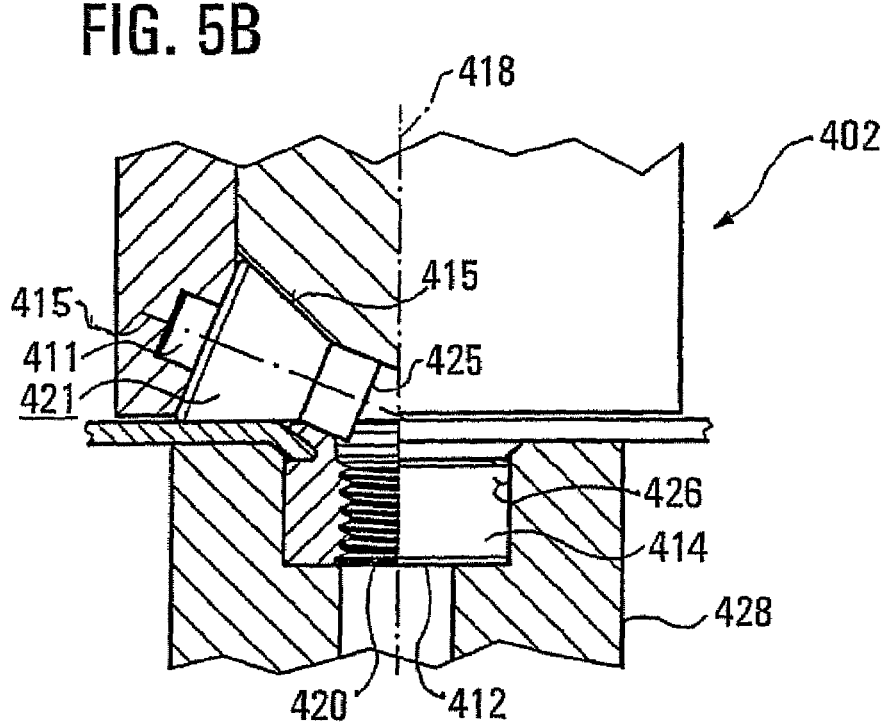

METHOD AND DEVICE FOR MOUNTING A FASTENER ELEMENT ON A PART, PARTICULARLY A SHEET METAL PART

The present invention relates to a method and an apparatus for the attachment to a pre-holed component, for example a sheet metal part, of a fastener element comprising a head part with a tubular rivet section which is disposed concentric to an axis of symmetry of the fastener element or of a fastener section of the fastener element and merges into the head part via a contact surface extending in a radial direction, characterized in that the rivet section is passed through the hole in the sheet metal part and the rivet section is beaded over, whereby the component is clamped in the region of the hole between the contact surface and the beaded over rivet section. The present invention also relates to similar methods and apparatus suitable for attaching a fastener element to a non pre-holed component in which the fastener element is used to form the hole in the component.

Methods and apparatus of the above-named kind are extremely well known in the field of attachment of fastener elements to sheet metal parts. For example, the German patent 3447006 describes how a fastener element, which can be obtained in commerce under the designation SBF from the company Profil Verbindungstechnik GmbH & Co. KG can be introduced in self-piercing manner into a sheet metal part. Furthermore the European patent 539793 describes the so-called clamping hole riveting process with which elements, in particular so-called RSN elements and RND elements (EP 1116891) of the company Profil Verbindungstechnik GmbH & Co. KG can be introduced into sheet metal parts.

In order to carry out the previously known methods it is mainly presses with considerable pressing forces which are used and which take care of the attachment of the fastener elements to sheet metal parts and indeed, in particular when the intention is also to give the sheet metal part a specific shape in the press. Not only elements of the company Profil Verbindungs-technik GmbH & Co. KG can be secured in this way and means to sheet metal part but rather also a series of further fastener elements from other competitors. It is also known, instead of using a press for the attachment of fastener elements, to secure these to sheet metal parts in C-frames and/or by means of robots, with in both cases corresponding force producing devices having to be present which frequently have to generate forces in tons in double figures.

With such devices the fastener elements must be attached to the sheet metal part in one stroke, the process thus takes place relatively quickly.

However, in smaller and larger workshops there are a multiplicity of possible applications, or for the manufacture of small series, where no heavy presses or any of the other named devices (C-frame or robot) are available, either because the corresponding businesses do not have such devices or because these are otherwise fully employed.

It is thus the object of the present invention to propose reliable methods and apparatuses which are able to attach fastener elements of the initially named kind to sheet metal parts without considerable forces having to be applied for this purpose so that businesses are also able to secure fastener elements to components, in particular to sheet metal parts, reliably even without large investments in relatively heavy apparatuses, with the method of the invention or the apparatus of the invention being able to be used for a multiplicity of diverse fastener elements.

In order to satisfy this object, a method of the initially named kind is provided, in accordance with a first variant of the invention, which is characterized in that the head part of the fastener element is received in a cut-out of a first tool and a second tool having a die shape for the progressive beading over of the rivet section is rotated into a position inclined to the axis of symmetry of the fastener element, about the axis of symmetry of the fastener element, with a relative axial feed movement being simultaneously effected between the tool receiving the head part and the tool having the die shape until the rivet section is completely beaded over.

In accordance with the invention, instead of using a large rapidly acting force a substantially smaller force is used which acts locally on the fastener element, or on its rivet section, and indeed over a comparatively long time (which can however straightforwardly lie in the range of seconds), with the force being progressively moved around the axis of symmetry of the fastener element and acting locally on the fastener element or on the rivet section or on the sheet metal part until the beading over of the rivet section is completed. Since the force which is used is significantly smaller or higher in comparison to the forces previously used the apparatus which is required to carry out the method is loaded to a substantially lower level and can be made correspondingly lighter and more compact and consumes even less material than was previously be necessary. Furthermore, on carrying out the method it is possible to work with die buttons which are identical to the die buttons previously used for the corresponding elements, or which have only been insignificantly modified, so that proven systems and systems tested in practice can also still be used with the new method and the new apparatus.

A first solution of the object set above in accordance with the invention provides a method of the initially named kind which is characterized in that the head part of the fastener element is received in a cut-out of a first tool and a second tool having a die shape for the progressive beading over of the rivet section is rotated into a position inclined to the axis of symmetry of the fastener element, about the axis of symmetry of the fastener element, with a relative axial feed movement being simultaneously effected between the tool receiving the head part and the tool having the die shape until the rivet section is completely beaded over.

A second solution of the above recited object provides a method of the initially named kind which is characterized in that the head part of the fastener element is received in a cut-out of a first tool and a second tool having a die button shape for the progressive beading over of the rivet section is brought into a position coaxial to the axis of symmetry of the fastener element and is pressed by a third tool inclined to the axis of symmetry and rotated about the axis of symmetry onto an end face of the second tool remote from the die button shape, with a relative axial feed movement being effected between the first tool which receives the head part and the third tool which co-moves the second tool in the sense of the feed movement until the rivet section has been completely beaded over.

This method also has the same advantages as quoted above in connection with the first variant of the solution in accordance with the invention.

A third solution in accordance with the invention of the above recited object provides a method of the initially named kind which is characterized in that the rivet section of the fastener element is pressed at least substantially in the direction of the axis of symmetry onto a die button designed for the progressive beading over of the rivet section by means of a tool arranged in an inclined position to the axis of symmetry of the fastener element, rotatable about the axis of symmetry of the fastener element and pressed onto an end face of the head part remote from the rivet section and in that a relative axial feed movement is simultaneously effected between the tool acting on the head part and the die button until the rivet section is completely beaded over.

This method also has the same advantages as set out above in conjunction with the first variant of the solution in accordance with the invention.

A fourth solution in accordance with the invention of the above recited object provides a method of the initially named kind which is characterized in that the head part of the fastener element is received in a cut-out of a first tool and a second tool is provided having at least one body of rotation rotatable about an axis inclined to the axis of symmetry for the progressive beading over of the rivet section, characterized in that for this purpose the second tool is rotated about the axis of symmetry and simultaneously a relative axial feed movement is effected between the first tool receiving the head part and the second tool until the rivet section is completely beaded over.

This method also has the same advantages as were set out above in conjunction with the first variant of the solution in accordance with the invention.

A fifth solution in accordance with the invention of the above recited object provides a method of the initially named kind which is characterized in that the component is arranged above a riveting die button and the rivet section is pressed through the component and subsequently beaded over by the exertion of a local force on the head part of the fastener element, the local force moving in circles around the central axis of symmetry or by exerting such a force on the die button or simultaneously carrying out a relative axial feed movement between the tool exerting the force and the die buttons.

Further preferred variants of the apparatus can be seen from the further patent claims and also from the following description.

Figure 1B:
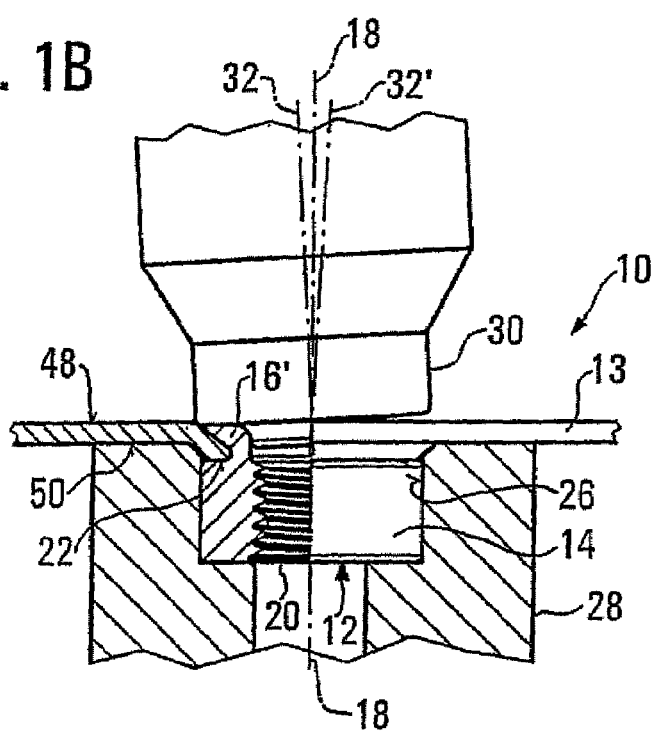
Figure 2A:
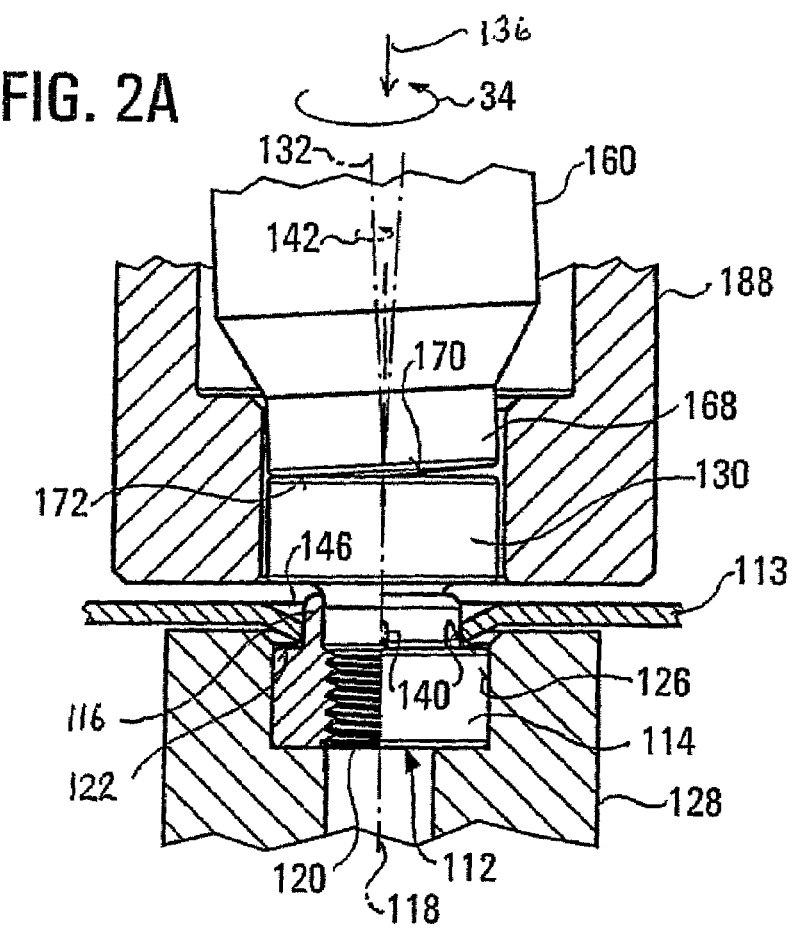
Figure 2B:
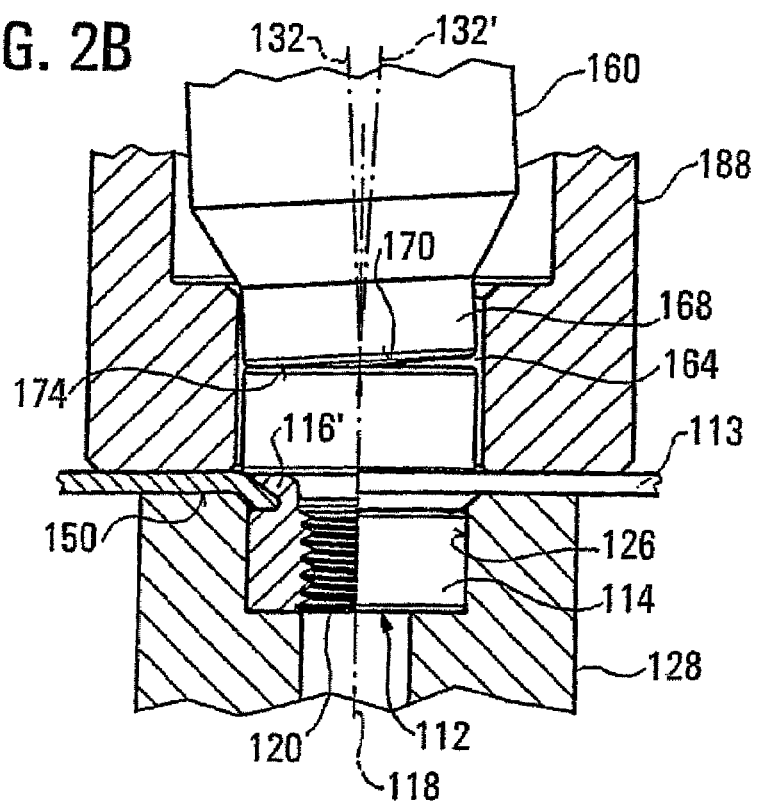
Figure 3A:
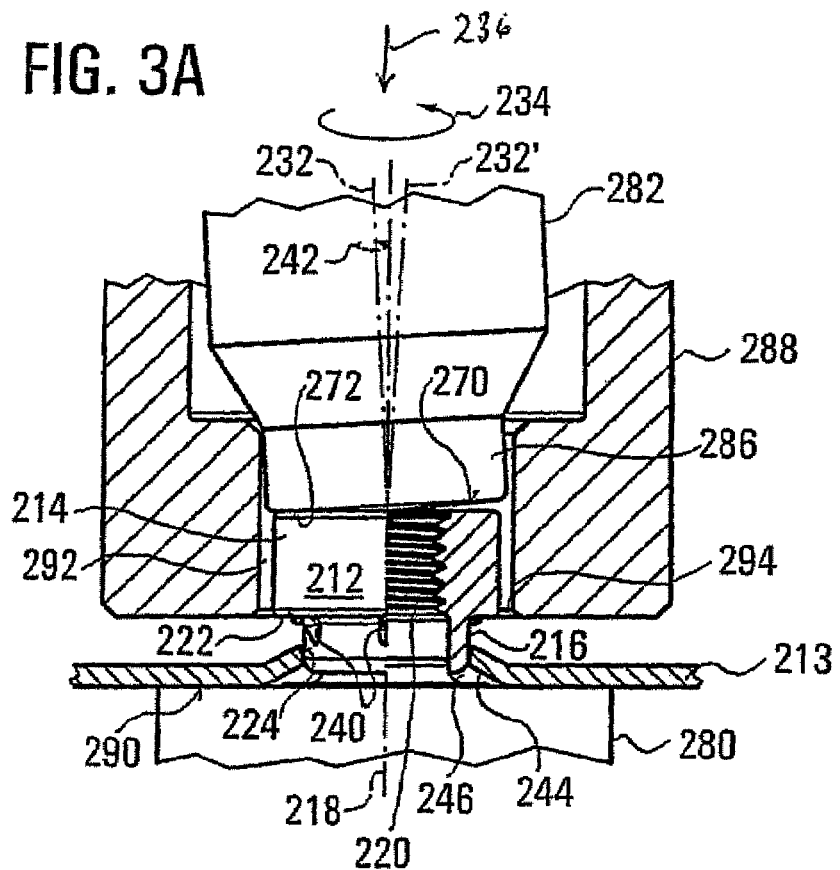
Figure 3B:
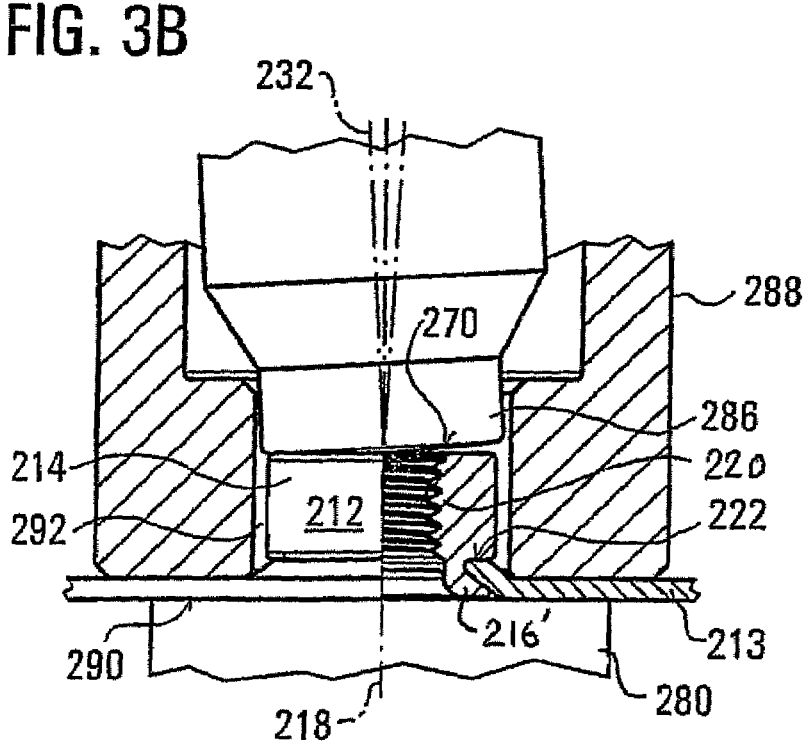
Figure 4A:
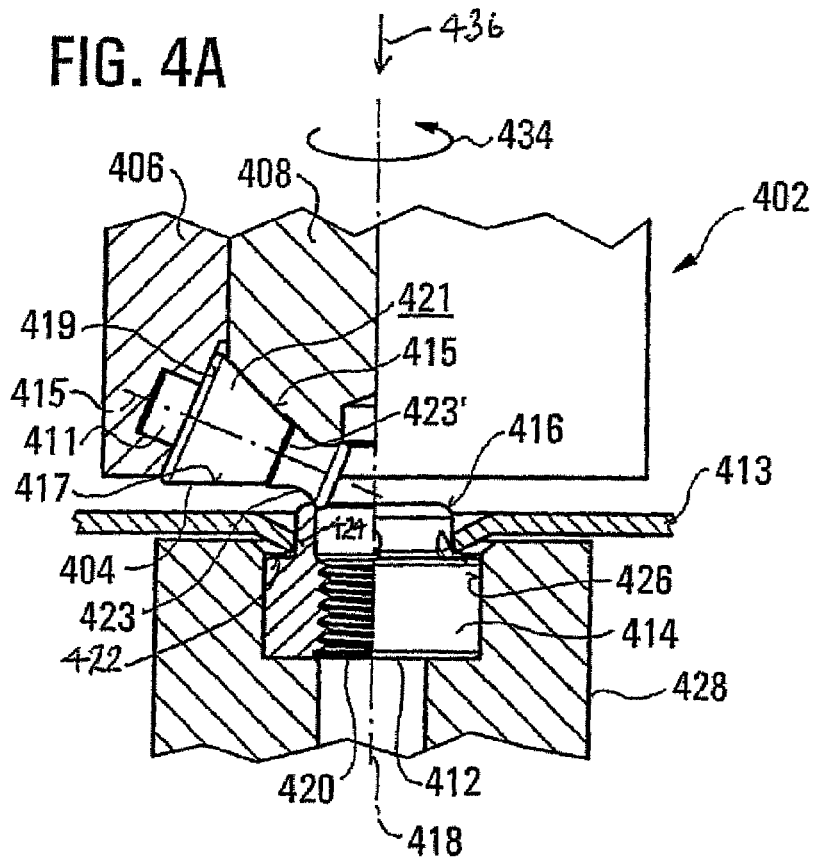
Figure 4B:
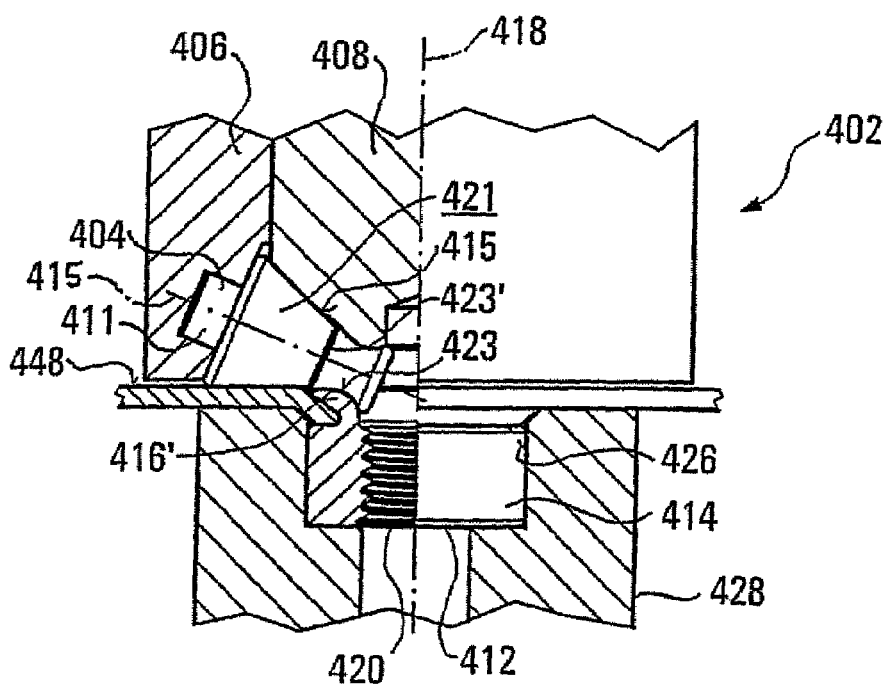
Figure 9A:
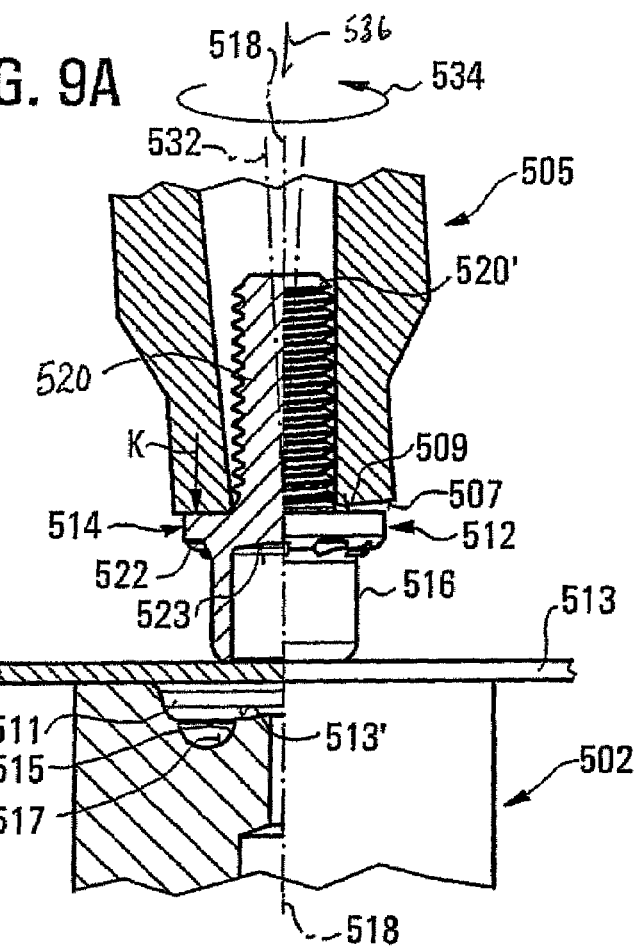
Figure 9B:
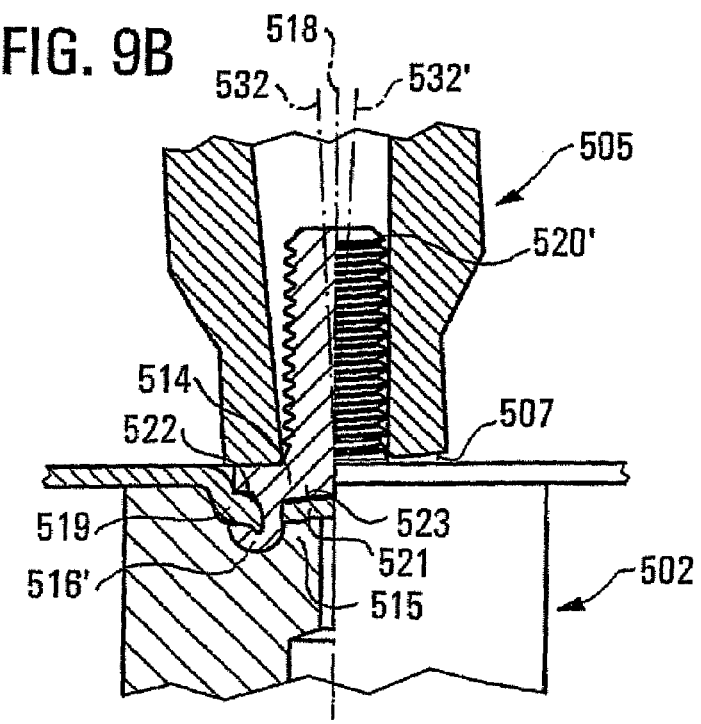

The invention will be explained in the following in more detail with reference to the drawing and to embodiments. In the drawing:

FIG. 1A shows a first embodiment in accordance with the invention of the attachment of a fastener element known per se to a sheet metal part immediately before the start of the beading over of the rivet section, FIG. 1B shows an illustration corresponding to FIG. 1 but immediately at the end of the beading over of the rivet section, FIGS. 2A and 2B show Figures corresponding to FIGS. 1A and 1B but of a variant of a method of the invention and of the apparatus of the invention, FIGS. 3A and 3B show Figures corresponding to FIGS. 1A and 1B but of a further variant of the method of the invention and of the apparatus of the invention, FIGS. 4A and 4B show Figures corresponding to FIGS. 1A and 1B but of another variant of the method of the invention and of the apparatus of the invention, FIGS. 5A, 5B; 6A, 6B; 7A, 7B; and 8A, 8B show modified versions of the method and of the apparatus of FIGS. 4A and 4B, likewise in accordance with the invention, FIGS. 9A, 9B; 10A and 10B show Figures corresponding to FIGS. 1A and 1B but of two "self-piercing" variants of the method of the invention and of the apparatus of the invention, and FIGS. 11A, 11B and 12A, 12B show Figures which show further embodiments in accordance with the invention.

Referring to FIGS. 1A and 1B an apparatus is shown which is designed in order to carry out a method for the attachment of a fastener element 12 to a pre-holed component, for example a sheet metal part. The fastener element has a head part 14 and a tubular rivet section 16 which is arranged concentric to an axis of symmetry 18 of the fastener element or of a fastener section 20 of the fastener element and which merges via a contact surface 22 extending in the radial direction into the head part 14. In this specific case the fastener element is an RSN nut element of the company Profil Verbindungstechnik GmbH & Co. KG so that the fastener section here has a thread arranged concentric to the axis of symmetry. The fastener element shown here is to be understood as being representative of a plurality of different elements including also RND nut elements or SBF bolt elements of the said company, with the attachment of the SBF bolt elements being described later with reference to FIGS. 9A, 9B and 10A, 10B. In this first variant of the method the rivet section is passed through the hole 24 in the sheet metal part and subsequently beaded over whereby the component 13 is clamped in the region of the hole 24 between the contact surface 22 and the beaded over rivet section 16' (FIG. 1B). In this method and in this apparatus the head part 14 of the fastener element is received in a cut-out 26 of a first tool 28 and a second tool 30 having a die button shape for the progressive beading over of the rivet section is rotated into a position 32 inclined relative to the axis of symmetry 18 of the fastener element about the axis of symmetry of the fastener element (arrow 34). At the same time a relative axial feed movement (arrow 36) is effected between the tool 28 receiving the head part 14 and the tool 30 having the die button shape until the rivet section 16 has been completely beaded over, as is shown at 16' in FIG. 1B. Because the tool 30 is inclined at the inclined axis 32 and is rotated about the axis of symmetry 18, the inclined axis 32 moves continuously and can for example be found at a later time at 32'.

The lower end face of the tool 30 shown in FIGS. 1A and 1B has a shape corresponding to that of the die button known per se for an RSN element, it can however be advantageous to ease or relieve the shape of the die button projection 38 somewhat in order to permit the squashing movement. At that point in time, during the beading over of the rivet section 16, the die button projection is in contact with the cylindrical rivet section only over a relatively small area which progressively moves around the axis of symmetry on rotation of the tool 30 and leads to a progressive local deformation of the bead of the rivet section. The feed movement in the direction of the arrow 36 which takes place at the same time leads, in combination with this rotary movement, to a progressive formation of the rivet bead 16' so that the latter can be finished with just a few rotations of the tool 30.

In order to carry out this process an apparatus (not shown) similar to a pillar drill or drill press can be used in which the first tool 28 is installed on the table of the pillar drill and the second tool 30 on the drilling head of the pillar drill in a position corresponding to the inclined axis 32 which ensures the rotation about the axis of symmetry 18. The feed movement can take place by hand by manual movement of the drilling head towards the table (as is customary in a pillar drill) or by a drive which moves the table towards the drilling head or the drilling head towards the table. Naturally special devices can also be provided which ensure the required movements. The sheet metal part can be positioned by hand or by a small robot on the rivet section, or can be secured or clamped to the table or to a support adjacent to the tool 28 or surrounding it (not shown), insofar as the tool 28 is not itself used for this purpose which is entirely possible.

During the beading over movement features 40 providing security against rotation which are provided on the fastener element, for example in the region of the rivet section 16 and/or the contact surface 22 and/or the transition from the rivet section 16 into the contact surface 22 are brought into engagement with the component 13.

In a further development of the method the second tool can be rotated not only about the axis of symmetry 18 of the fastener element but rather simultaneously about the axis of inclination 32 which is defined by the inclined position of the second tool. An additional rotary movement of this kind is indicated by the arrow 42 in FIG. 1A.

Although the pre-holed component could lie in a plane in the region of the hole the pre-holed component 13 is provided with a conical rim 44 surrounding the hole 24. The rivet section 16 is pushed from the side of the projecting conical rim 44 through the hole 24. This makes it possible for the rivet section 16', through the beading action, to fill out the ring space 46 which is provided at the side 48 of the component remote from the head part 14 of the fastener element 12 in the region of the conical rim 44, so that the beaded over rivet bead 16' at least substantially does not project beyond the side 48 of the component remote from the head part and is preferably disposed set back from this side.

The conical rim 44 of the component can be at least partly pressed flat during the beading over of the rivet section 16, whereby a type of clamping-hole riveting can be realized.

The radially extending contact surface 22 around the tubular rivet section 16 can have an axial recess corresponding to an RND nut and/or a radial recess in accordance with an EBF nut or an EBF bolt (both not shown). In such a case the material of the component is pressed into the corresponding recess during beading over of the rivet section and is clamped there by the beading over of the rivet section, which favors the press-out resistance and the security against rotation.

The cut-out 26 of the first tool 28 which receives the fastener element 12 is dimensioned in comparison to the head part 14 of the fastener element such that the contact surface 22 is set back below the end face 50 of the first tool facing the sheet metal part 13, with a receiving space 52 for the conical rim region of the hole in the component being provided during the re-shaping of the rivet section.

Furthermore, the ring-like receiving space for the rivet bead is formed or maintained in that the cut-out 26 merges via a conical surface into the said end face of the first tool.

The enclosed cone angle of the conical surface 54 is smaller in this example than the conical rim region 44 of the component 13.

A further second method in accordance with the invention and a further second apparatus in accordance with the invention for the attachment of the fastener element which have already been described in detail in conjunction with FIGS. 1A and 1B are shown in FIGS. 2A and 2B. The same reference numerals are used in the description of FIGS. 2A and 2B for parts which were previously used in the FIGS. 1A and 1B embodiment but with the additional number 100. It will be understood that the same description applies to these parts as to the embodiment of FIGS. 1A and 1B unless something is stated to the contrary.

In this method and in this apparatus the head part 114 of the fastener element is likewise received in a cut-out 126 of a first tool 128. The second tool 130 having a die button shape for the progressive beading over of the rivet section 116 is here however brought into a position coaxial to the axis of symmetry 118 of the fastener element and is pressed by a third tool 160 inclined to the axis of symmetry and rotated around the axis of symmetry 118 onto an end face 162 of the second tool 130 remote from the die button shape. The relative axial feed movement between the first tool 128 which receives the head part 114 and the third tool 160 which co-moves the second tool 103 is executed during rotation of the third tool 160 about the axis of symmetry 118 until the rivet section 116 has been fully beaded over 116' (FIG. 2B).

The second tool 130 is normally not co-rotated by the rotary movement of the third tool but rather adopts different slightly inclined positions during the rotation of the third tool which serve for the local force transmission to the rivet section.

The second tool 130 is held here in a circularly cylindrical mount 164 of a guide part 166 and is guided with some radial clearance. The guide part 166 is biased by means of a non-illustrated spring towards the sheet metal part and serves, at least in the end stage of the beading over of the beading section 116, as a hold-down member for the sheet metal part 113. It clamps this against the end face 150 of the first tool 128.

The third tool 160 preferably has a cylindrical end face 168 which is likewise arranged in a circular cylindrical mount 164 of the guide part 166 and is guided by the latter.

The end face 170 of the third tool which presses onto the end face 172 of the second tool remote from the die button projection 138 has a conical shape whereby the third tool 160 forms an at least substantially linear contact 174 with the end face 172 of the second tool, with this line of contact 174 being located at least predominantly to one side of the axis of symmetry 188 and moving about the axis of symmetry 118 on rotation of the third tool.

Here also features 140 providing security against rotation, which are attached to the fastener element, for example in the region of the rivet section and/or of the contact surface and/or at the transition from the rivet section into the contact surface are brought into engagement with the component 113 during the beading movement.

The possibility also exists here of not rotating the third tool 160 only about the axis of symmetry 118 of the fastener element, but rather simultaneously also about the axis of inclination 132 which is defined by the inclined position of the second tool.

The design of the tool 128 and the receiver of the fastener element in the cut-out 126 are identical to the embodiment of FIGS. 1A and 1B and will not be especially described here.

Here the conical rim of the component can also be at least partly pressed flat during beading over of the rivet section.

The radially extending contact surface around the tubular rivet section can also have an axial recess and/or a radial recess here and the material of the component can be pressed into this recess during the beading over of the rivet section and trapped there by the beading over of the rivet section.

A third method in accordance with the invention and furthermore a third apparatus in accordance with the invention for the attachment of the fastener element which have already been described in detail in connection with FIGS. 1A and 1B are shown in FIGS. 3A and 3B. In the description of FIGS. 3A and 3B the same reference numerals will be used for parts previously described in connection with the FIGS. 1A and 1B embodiment but will be provided with the additional number 200. It will be understood that the same description applies to these parts as to the embodiment of FIGS. 1A and 1B unless something is stated to the contrary.

This third embodiment is characterized in that the rivet section 216 of the fastener element 212 is pressed at least substantially in the direction of the axis of symmetry 218, onto a die button 280 designed for the progressive beading over of the rivet section, by means of a tool 282 arranged in an inclined position 232 relative to the axis of symmetry 218 of the fastener element, is rotatable about the axis of symmetry 218 of the fastener element and is pressed onto an end face 284 of the head part 214 remote from the rivet section 216. At the same time a relative axial feed movement is effected between the tool 282 acting on the head part 214 and the die button 280 until the rivet section 216 is completely beaded over at 216' (FIG. 3B).

The tool 282 has a cylindrical front part 286 facing the fastener element which is held in a circular cylindrical mount of a guide part 288 and guided with some radial clearance. The guide part 288 is biased towards the sheet metal part, for example, by means of a non-illustrated spring and serves, at least in the end stage of the beading over of the rivet section 216 as a hold-down member for the sheet metal part 213 and clamps this against the end face 290 of the die button 280.

The end face of the tool 282 which presses onto the end face of the head part 214 of the fastener element remote from the die button projection 238 has a conical shape, whereby the tool forms an at least substantially linear contact 272 with the end face of the head part of the fastener element, with this line of contact being located predominantly on one side of the axis of symmetry 218 and moving around the axis of symmetry 218 on rotation of the tool 282.

Here also features 240 providing security against rotation which are attached to the fastener element, for example in the region of the rivet section 216 and/or of the contact surface 222 and/or at the transition from the rivet section 216 into the contact surface 222 are brought during the beading movement into engagement with the component.

Here also the tool 282 can not only be rotated about the axis of symmetry 218 of the fastener element 212 but rather also simultaneously about the axis of inclination which is defined by the inclined position of the tool.

The pre-holed component 213 is also provided here with a conical rim 244 surrounding the hole 224, with the rivet section 216 being pushed through the hole from the side of the projecting conical rim. Through the beading over of the rivet section the latter fills out the ring space 246 which is provided at the side of the component 213 remote from the head part 214 of the fastener element in the region of the conical rim, so that the turned over rivet bead at least substantially does not project beyond the side of the component remote from the head part of the fastener element.

In this example the conical rim 244 of the component can be at least partly pressed flat during the beading over of the rivet section 216 in the sense of the clamping hole riveting process.

Here also the radially extending contact surface 222 can have an axial recess and/or a radial recess around the tubular rivet section 216. During beading over of the rivet section the material of the component is pressed into this recess and is clamped there by the beading over of the rivet section.

A ring-like receiving space 290 for the rivet bead 216 in the component 213 can be formed here by receiving the head part 214 of the fastener element within a cut-out 292 of the guide part 288, with the cut-out merging via a conical surface 294 into the end face of the guide part. In the end stage of the beading process the guide part 288 can press the component against the end face of the die button, with the contact surface 222 of the fastener element 212 transferring from a first position aligned with the end face of the guide part (FIG. 3A) at the start of the beading process into a position set back relative to this end face (FIG. 3B) at the end of the beading process.

A fourth method in accordance with the invention and a further fourth apparatus in accordance with the invention for the attachment of the fastener element are shown in FIGS. 4A and 4B. In the description of FIGS. 4A and 4B the same reference numerals are used for parts as were previously used in the FIGS. 1A and 1B embodiment but provided with the additional number 300. It will be understood that the same description applies to these parts as to the embodiment of FIGS. 1A and 1B unless something contrary is expressed.

This fourth embodiment is characterized in that the head part 414 of the fastener element 412 is received in a cut-out 426 of a first tool 428 and a second tool 402 having at least one body of rotation 404 rotatable about an axis set obliquely to the axis of symmetry 418 is provided for the progressive beading over of the rivet section 416, with the second tool being rotated about the axis of symmetry 418 for this purpose and with a relative axial feed movement simultaneously being effected between the first tool 428 receiving the head part 418 and the second tool 402 until the rivet section 416 has been completely beaded over.

The second tool 402 has an outer ring-like part 406 and a central cylindrical part 408. The body of rotation 404 is provided with a bearing spigot which is rotatably guided in the outer ring 406. Either only the inner part 408 is directly driven around the axis of symmetry 418, whereby the body of rotation 404 rotates about the inclined axis 415, rolls off on the rivet section 416 and is supported by the inner part 408 of the second tool 402, with the outer part 406 then being co-driven via the bearing spigot, but otherwise being able to be regarded as freely rotatable, or the outer part 406 is driven simultaneously with the inner part about the axis of symmetry.

The shape of the inner part 408 of the second tool 402 in the region of its end face 415 which contacts the jacket surface 417 of the body of rotation 404 is complementary to the shape of the body of rotation. The body of rotation has, at its jacket surface, over a considerable part of the length of the jacket surface, a line contact with the end face 415 of the inner tool 408 and is supported by the latter.

The body of rotation 404 has a radially extending surface 419, related to the inclined axis in the region of the guide spigot 411, with the radially extending surface being supported on a counter surface 421 of the outer ring 406 of the second tool 402 whereby the position of the body of rotation 404 along the inclined axis 413 is fixed in the direction away from the axis of symmetry 418.

In the example of FIGS. 4A and 4B the body of rotation 404 has a first conical section 421 arranged in the region of the guide spigot and converging when going away from the guide spigot 411 as seen in the direction of the inclined axis 415, i.e. going towards the axis of symmetry 418. Following the conical region the body of rotation 404 has a waisted section 423, for example with the shape of an hour glass, a bollard or a capstan which cooperates with the rivet section 416' for the carrying out of the beading over operation. This waisted section 423 merges via a small ring chamfer 423' into the conical section 421. This ensures that the beaded over rivet section 416 lies beneath the upper side 448 of the sheet metal part. The end face of the inner part 408 has a small relief at the position of the ring chamfer. Through the contact of the conical section 421 of the body of rotation at the inner part 408 of the second tool 402 a movement of the body of rotation along the inclined axis 413 towards the axis of symmetry 418 is prevented or restricted.

Further modified versions of the embodiment of FIGS. 4A and 4B will now be described in more detail with reference to the further FIGS. 5A, 5B; 6A, 6B; 7A, 7B and 8A, 8B. In these Figures the same reference numerals are used as in FIGS. 4A and 4B and it will be understood that the description of FIGS. 4A and 4B applies correspondingly to the further Figures.

In the embodiment in accordance with FIGS. 5A, 5B the body of rotation 404 likewise has a first conical section 421 arranged in the region of the guide spigot which converges going away from the guide spigot 411 in the direction of the inclined axis 415 i.e. going towards the axis of symmetry 418.

Following the conical region the body of rotation 404 has a circular cylindrical section 425 which cooperates with the rivet section 416 for carrying out the beading over operation. The contact of the conical section 421 of the body of rotation 404 at the inner part 408 of the second tool 402 prevents and restricts a movement of the body of rotation 404 along the inclined axis 419 towards the axis of symmetry 418.

Figure 6A:
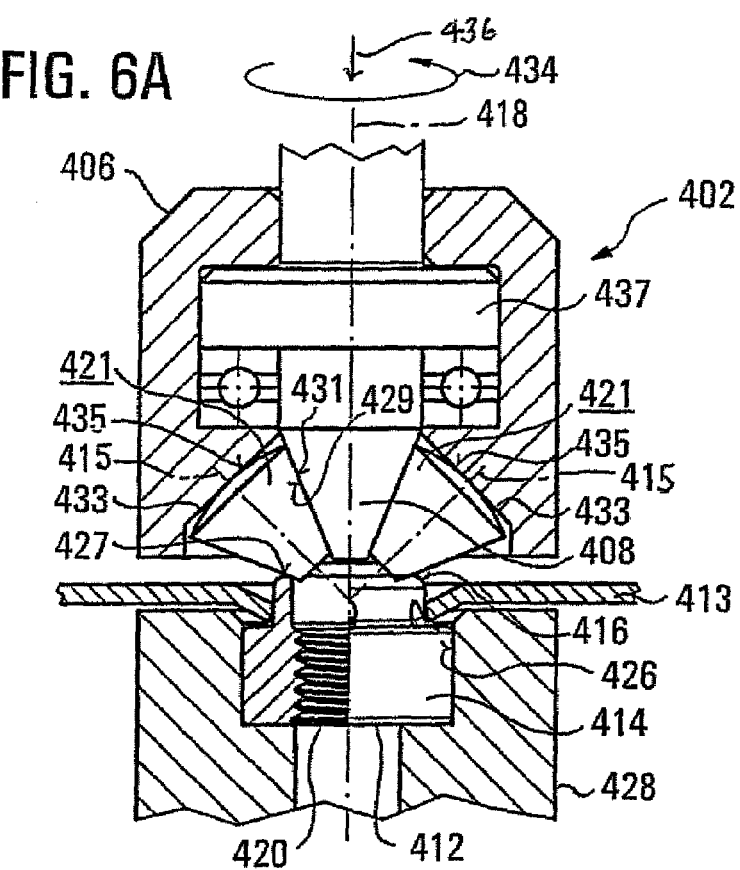
Figure 6B:
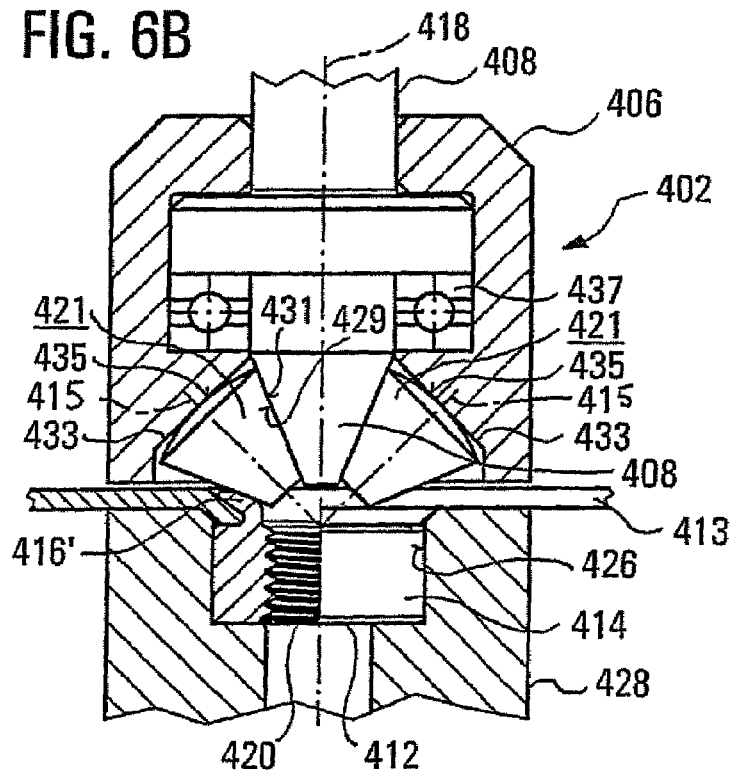

In accordance with FIGS. 6A, 6B two or more bodies of rotation 404 can be provided which each have a conical section 421 which enters into contact with the inner side of the tubular rivet section 416 and with a conical section 431 of the inner part 408 of the second tool 402, each body of rotation being supported on the second tool at a side 428 diametrically opposite to the point of contact 427 with the rivet section.

In this embodiment, the or each body of rotation 404 has, at its end face 433 remote from the fastener element 412, a curved surface 433 which contacts a support surface 435 of the ring-like part 406 of the second tool 402 which stands at least approximately perpendicular to the respective inclined axis 415 at the position of the respective body of rotation 404.

The outer part 406 of the second tool 402 is supported by an axial bearing 437 at the inner part, whereby a relative rotary movement between these parts, which arises automatically, takes place more easily.

Figure 7A:
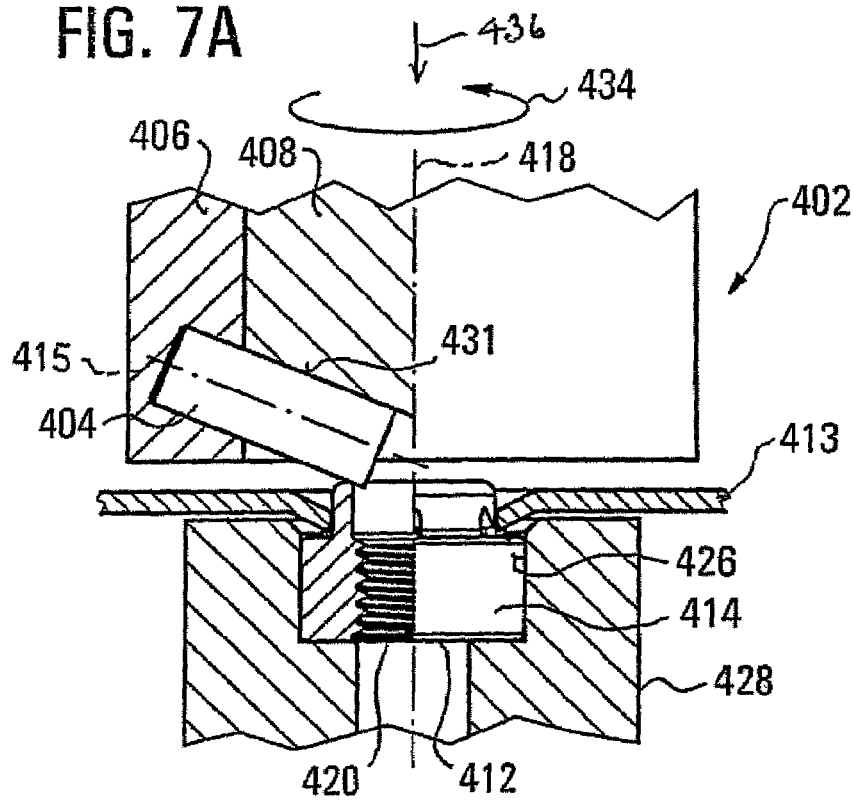
Figure 7B:
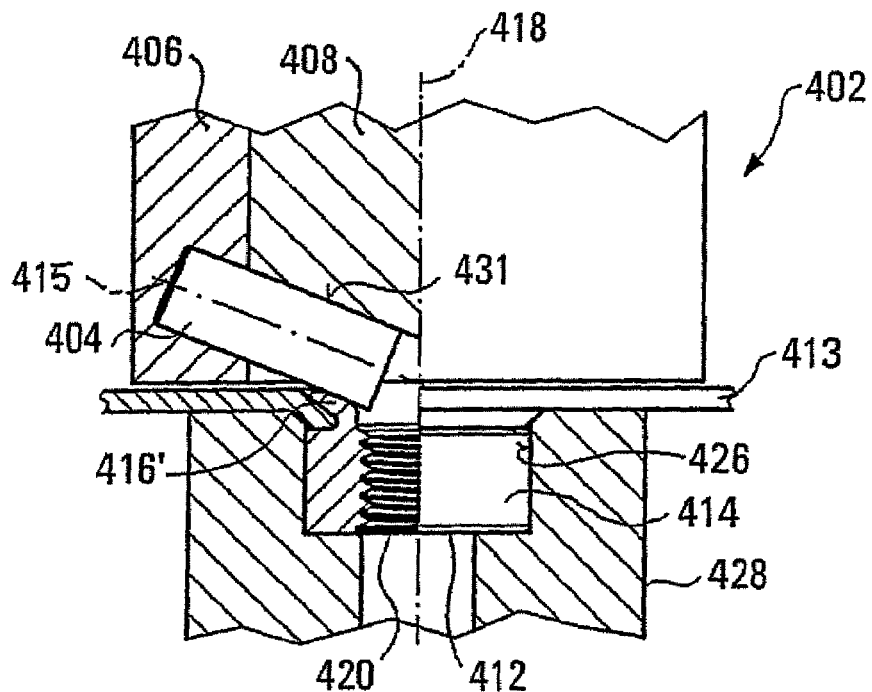

In accordance with FIGS. 7A and 7B the beading over of the rivet section 416 is effected with a circularly cylindrical, obliquely inclined, body of rotation 404. It would also be conceivable for the axis of rotation of the body of rotation or of the bodies of rotation to be arranged horizontally i.e. perpendicularly to the axis of symmetry with a corresponding design of the body of rotation, for example a design resembling a bottleneck and a complementary design of the end face of the inner part 408.

Figure 8A:
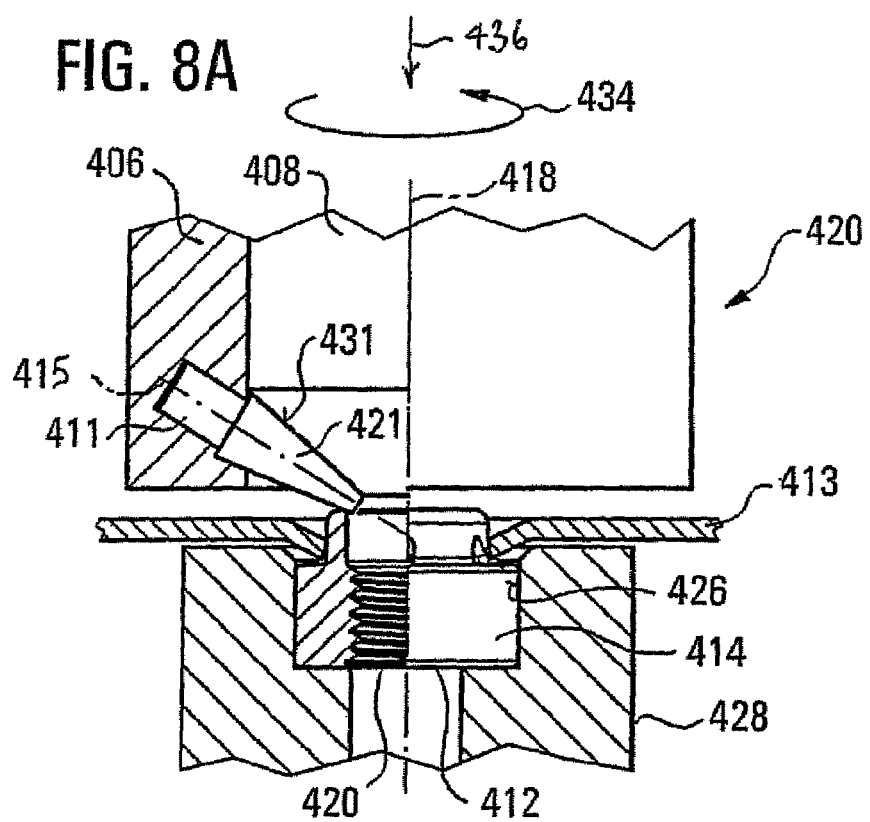
Figure 8B:
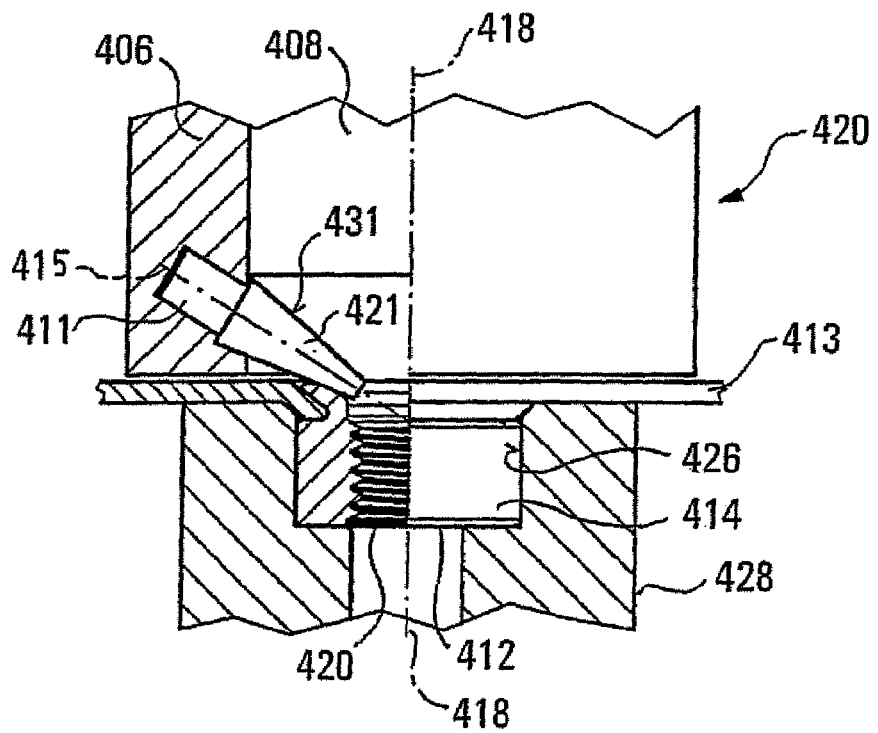

In accordance with FIGS. 8A and 8B the body of rotation 404 only has a conical section 421 in addition to the guide spigot 411.

In all these embodiments features 440 providing security against rotation, which are attached to the fastener element 412, for example in the region of the rivet section 416 and/or the contact surface 422 and/or at the transition from the rivet section 416 into the contact surface 422 are brought into engagement with the component during the beading movement.

Here the pre-holed component 413 is also provided with a conical rim 444 surrounding the hole 424, with the rivet section 416 being pushed through the hole from the side of the projecting conical rim. Here the rivet section, through the beading over operation, also fills the ring space 446 out which is provided at the side of the component 413 remote from the head part 414 of the fastener element in the region of the conical rim 444, so that the laid-over rivet bead at least substantially does not project beyond the side of the component remote from the head part of the fastener element.

The conical rim of the component can be at least partly pressed flat during the beading over of the rivet section 416.

In these embodiments it is possible to provide the radially extending contact surface around the tubular rivet section with an axial recess and/or a radial recess and, during the beading over of the rivet section, to press the material of the component into this recess and to clamp it there by the beading over of the rivet section.

The method of the invention for the attachment to a component, for example a sheet metal part, of a fastener element, in which the fastener element has a head part having a tubular rivet section which is disposed concentric to an axis of symmetry of the fastener element and of a fastener section of the fastener element and which merges via a contact surface extending in a radial direction into the head part, and in which the rivet section is passed through the component while forming a hole in it, with the rivet section being beaded over, whereby the component is clamped in the region of the hole between the contact surface and the beaded over rivet section, can be carried out in such a way that the component is arranged above a riveting die button and a local force is exerted onto the head part of the fastener element with the local force moving in circles around the central axis of symmetry whereby, on simultaneously carrying out a relative axial feed movement between the tool exerting the force and the die button, the rivet section is pressed through the component and subsequently beaded over. Alternatively to this, the local force can be exerted onto the die button rather than onto the head part.

With this method and with the corresponding apparatus an unpierced sheet metal part is used instead of a sheet metal part which is pre-holed at the position of the attachment of the functional element and the rivet section of the fastener element is now pressed through the sheet metal part.

The way this can be done will now be described with reference to FIGS. 9A and 9B and indeed for the variant in which the local force is exerted onto the head part of the fastener element.

Referring now to FIGS. 9A and 9B a functional element 512 is shown there which represents an SBF element of the company Profil Verbindungstechnik GmbH & Co. KG, either in accordance with the old embodiment of German patent 3447006 or with the special design of the rivet section 516 in accordance with the PCT application PCT/EP02/10001. The fastener element 512 also has a head part 514 here with a tubular or cylindrical rivet section 516 which is disposed concentric to an axis of symmetry 518 of the fastener element or of the fastener section 520' of the fastener element. In this example the fastener section 520' is formed by an external thread, i.e. the fastener element is a male fastener element.

The cylindrical rivet section merges via a contact surface 522 extending in the radial direction into the head part 514. When the discussion here is of a contact surface extending in the radial direction this does not mean that the contact surface can only lie in a plane perpendicular to the axis of symmetry 518 but rather that the contact surface leads away from the axis of symmetry in the radial direction, i.e. with a radial component. That is to say the contact surface could for example also be a conical surface. These considerations apply here to all examples. In this example the sheet metal part 513 is supported on a customary die button 502 for the attachment of an SBF bolt to the sheet metal part, with this die button being known per se from the mentioned German patent 3447006.

Above the head part 514 of the bolt element 512 there is located an upper tool 505 with a central passage which serves to accommodate the shaft part, i.e. the fastener section 520' of the fastener element. The lower end face 507 of the tool 505 in FIG. 9A is formed as a conical surface and the tool 505 adopts an inclined position 532 to the central axis of symmetry 518 of the fastener element 512. As a result of the conical shape of the upper tool 505 and the corresponding inclined position of the upper tool 505 the conical end face of the upper tool 505 lies in the illustration of FIG. 9A only on the left side of the ring surface 509 which is provided at the transition of the fastener section 520' into the head part 514. On rotation of the tool 505 in the inclined position shown around the axis of symmetry 518 a local force, indicated by the arrow K in FIG. 9A, is exerted onto the ring surface 509 of the bolt element, with this force K moving around the ring surface on rotation of the tool 505, i.e. around the axis of symmetry 518. This movement corresponds to the movement which was described in conjunction with the other method variants. It signifies that the rivet section also exerts a local force onto the sheet metal part 513, whereby the rivet section first leads to an indentation of the sheet metal part into the corresponding hollow cavity 511 of the die button until, shortly before reaching the end face 513' of the central post 515 of the die button, the rivet section 516 cuts through the sheet metal part and is subsequently rolled radially outwardly by contact with the ring-like rolling surface 517 of the die button, whereby the ring collar 519 which is formed from the sheet metal material 513 is clamped between the beaded over rivet section 516' (FIG. 9B) and the radially extending contact surface 522. The slug 521 which arises through the piercing of the sheet metal part is urged between the inner projection 515 of the die button and the base 523 of the tubular rivet section 516 and is firmly clamped there by light expansion of the rivet section beneath the piercing slug, whereby the connection between the bolt element 512 and the sheet metal part 513 is also stiffened. On achieving the position shown in FIG. 9B the attachment process is completed. The upper tool 505 can be lifted away and the sheet metal part 513 with the attached fastener element 512 can be lifted from the die button 502.

Figure 10A:
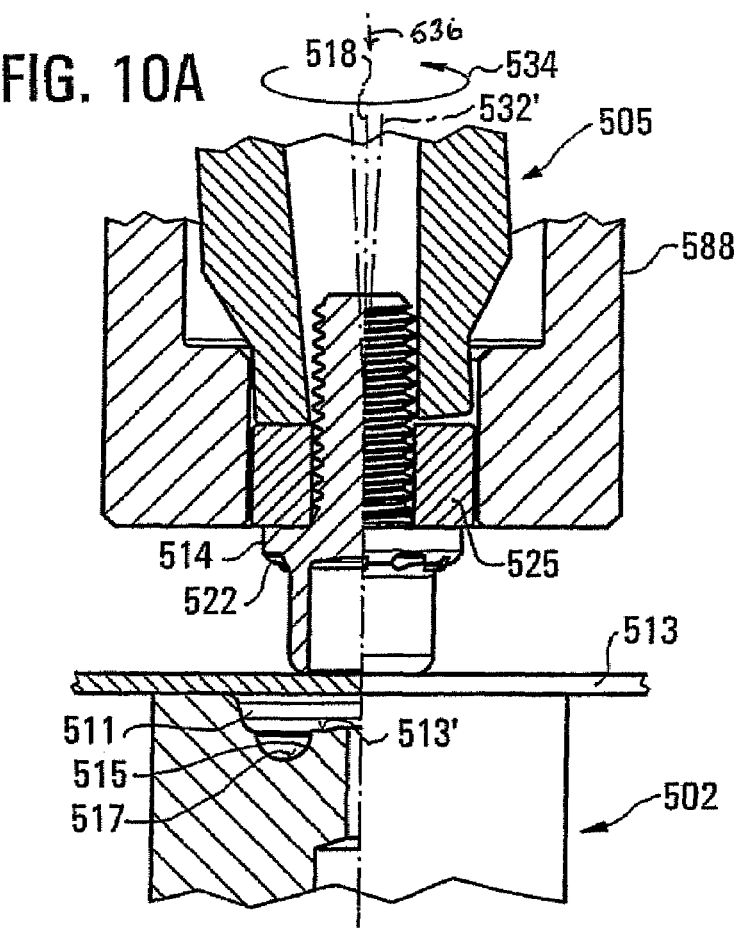
Figure 10B:
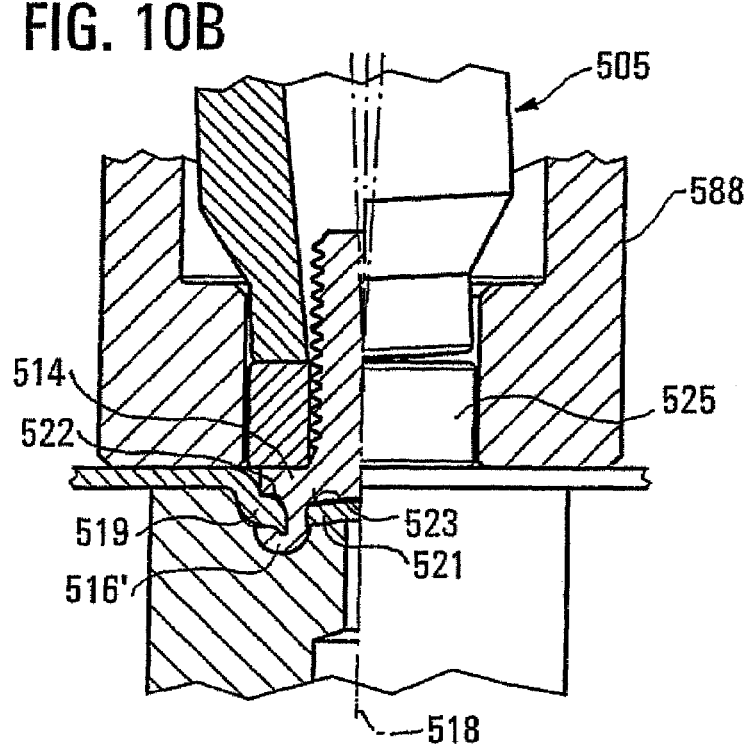

The FIGS. 10A and 10B show an apparatus similar to the apparatuses of FIGS. 9A and 9B, with the same reference numerals being used in FIGS. 10A and 10B as were used in FIGS. 9A and 9B and only the particular differences being described more precisely. It will be understood that the description of FIGS. 9A and 9B likewise applies to parts of FIGS. 10A and 10B which are provided with the same reference numerals.

The main distinction between the embodiment of FIGS. 10A and 10B and that of FIGS. 9A and 9B lies in the fact that the upper tool 505 does not work here directly on the ring surface of the bolt element 512 but rather indirectly via a ring 525. Furthermore, the ring 525 and also the cylindrical lower section of the tool 505 is guided in a guide part 588, in the cylindrical guide recess 592, with some radial clearance, which facilitates the alignment of the bolt element 512 with the die button 502. It is namely important that the die button 502 and the fastener element 512 are aligned coaxial to one another i.e. to the axis of symmetry 518 so that the riveting process can be executed more cleanly.

Figure 11A:
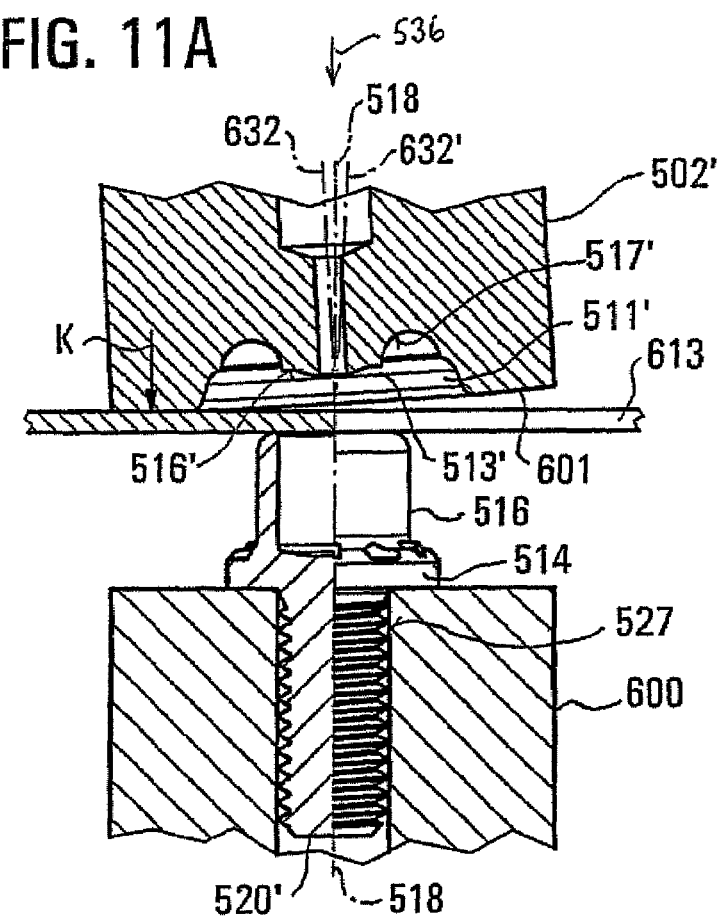
Figure 11B:
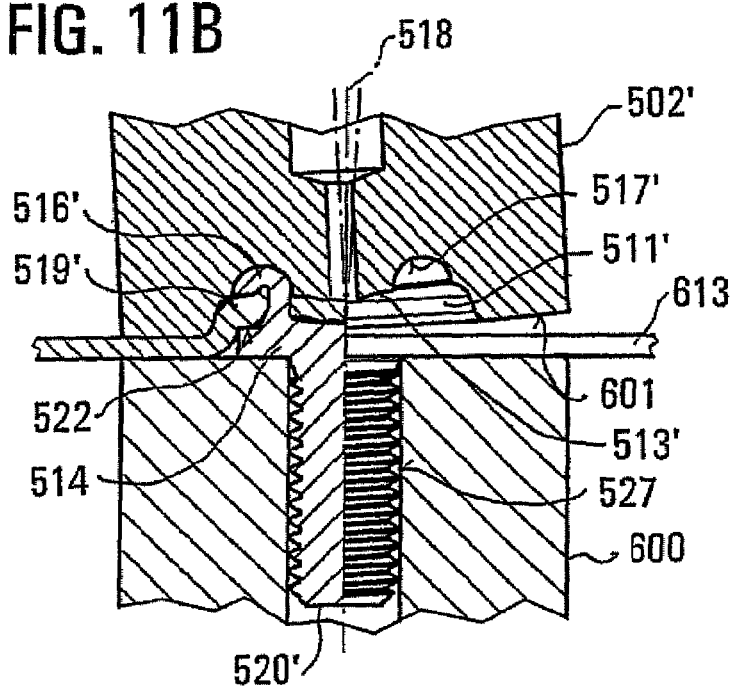
Figure 12A:
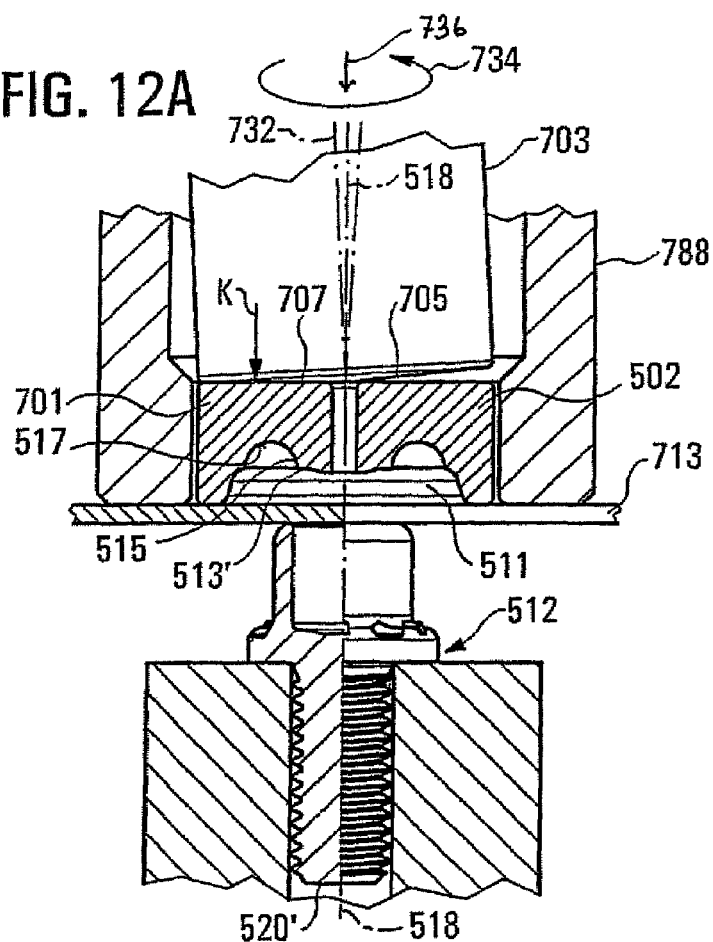
Figure 12B:
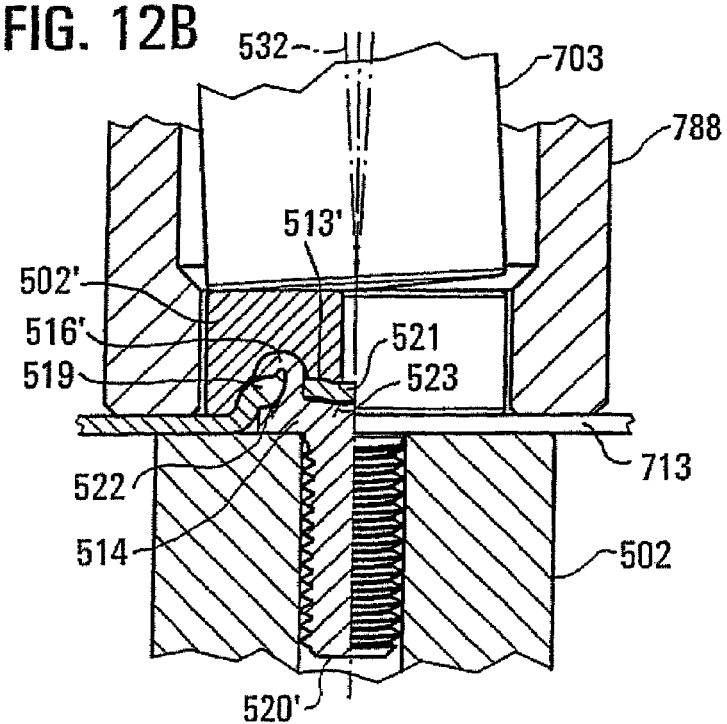

Instead of allowing the local force to act on the head part of the bolt element 512 the local force can be exerted by means of the die button 512' onto the sheet metal part in accordance with the embodiment of FIGS. 11A and 11B.

In this example the shaft part, i.e. the fastener section 520' of the fastener element 512, is received in a guide mount 527 of a lower tool 600. The sheet metal part 613 is placed onto the rivet section 516 of the bolt element 512 and the die button 502' is rotated in an inclined position 632 around the axis of symmetry 518 of the fastener element 512. The lower end face 602 of the die button 502' is made slightly conical here in FIG. 11A, so that a contact with the sheet metal part 613 takes place in FIG. 11A only at the left side of the axis of symmetry 518. By rotation of the die button 502' around the axis of symmetry 518 the local force K moves in ring-like manner around the axis of symmetry 518 and takes care, in accordance with the embodiment of FIGS. 9A and 9B of the generation of a recess in the sheet metal part (in the illustration of FIG. 11A an elevation) inside the hollow cavity 511' of the die button until the rivet section 516' pierces through the sheet metal part and is laid by the roll surface 517' around the thus formed collar 519' of the sheet metal part 513, whereby, in accordance with FIG. 11B this collar 519' is also clamped here between the contact surface 522 and the beaded over rivet section 516'. Here the slug 521' is also fixedly clamped within the rivet section.

Instead of rotating the die button as a whole about the axis of symmetry the front section 701 of the die button 502 in accordance with FIG. 9A can be used in order to carry out the piercing and riveting process. In this variant, shown in FIGS. 12A and 12B, the front section of the die button stands coaxial to the fastener element 512 i.e. coaxial to the axis of symmetry 518. A tool 703 is used which is arranged in an inclined position 732 and is rotated about the axis of symmetry 518. The lower end face 705 of the corresponding tool is conically executed, whereby a line contact 707 takes place with the upper end face of the die button section 701 in FIG. 12A remote from the sheet metal part 713. This line contact can be seen here at the left side of the axis of symmetry. However, on rotation of the tool, it migrates in a ring-like manner about the axis of symmetry 708.

In this embodiment the die button is received in a cylindrical mount of a guide part 788 with some radial clearance. This clearance is necessary because (as in other corresponding embodiments) the exertion of a local force K which moves in ring-like manner around the axis of symmetry 518 leads to a slight tilting of the die button section 701 or of the corresponding tool part and the mounting of the guide part 788 must permit this slight tilting. On the other hand the guide part 788 serves for a good alignment of the die button section with the central longitudinal axis 518 of the fastener element, i.e. with the axis of symmetry.

Although the fastener element is so-to-say introduced into the sheet metal part in a self-piercing manner in the embodiments of FIGS. 9A, 9B; 10A, 10B; 11A, 11B; 12A, 12B, the sheet metal part could be pre-holed, as in the examples of FIGS. 1 to 8. The tools of FIGS. 1 to 8 could then also be used for the application of the bolt elements in a form matched to the form of the respective bolt element. The nut elements of FIGS. 1 to 8 or nut elements comparable thereto could likewise be introduced into the respective sheet metal part in a self-piercing manner.

In the embodiments of FIGS. 9A, 9B; 10A, 10B; 11A, 11B; 12A, 12B the tool which is rotated about the axis of symmetry 518 can also be rotated about the inclined axis if this seems advantageous.

Finally, it should be pointed out that all steel or aluminum or magnesium sheet metal parts can be considered for the sheet metal part which have deep drawing qualities while somewhat stronger materials are used for the functional element.

In all embodiments all materials can be named as an example for the material of the functional elements which reach the strength values of class 8 or higher in accordance with the ISO standard in the context of cold deformation, for example a 35B2 alloy in accordance with DIN 1654. The thus formed fastener elements are suitable, amongst other things, for all commercially customary steel materials for drawing quality sheet metal parts and also for aluminum or its alloys. Also aluminum alloys, in particular those of higher strength, can be used for a functional elements, for example $AlMg_5$. Also functional elements of higher strength magnesium alloys such as for example AM50 can be considered.

The invention claimed is:

1. An apparatus for the attachment to a pre-holed sheet metal part (113) of a fastener element (112) comprising a head part (114) and a tubular rivet section (116) which is disposed concentric to an axis of symmetry (118) of the fastener element (112) or of a fastener section (120) of the fastener element and merges into the head part (114) via a contact surface (122) extending in a radial direction, wherein the rivet section (116) can be passed through the hole (124) in the sheet metal part and the rivet section can be beaded over, whereby the sheet metal part can be clamped in the region of the hole between the contact surface (122) and the beaded over rivet section (116'), wherein the apparatus is provided with a first tool having a cutout (126) for the reception of the head part (114) of the fastener element (112), wherein a second tool (130) is provided having a die button shape for the progressive beading over of the rivet section and can be brought into a position coaxial to the axis of symmetry (118) of the fastener element and wherein a third tool (160) is provided which is inclined to the axis of symmetry and can be rotated about the axis of symmetry which can be pressed onto an end face of the second tool (130) remote from the die button shape, with a device being provided which permits a relative axial feed movement (136) between the first tool (128) which receives the head part and the third tool (160) which co-moves the second tool (130).

2. An apparatus according to claim 1, wherein the second tool is held in a circularly cylindrical recess of a guide part and guided with some radial clearance.

3. An apparatus according to claim 2, wherein the guide part is biased towards the sheet metal part and serves, at least in the end stage of the beading over of the rivet section, as a hold-down member for the sheet metal part and clamps the latter against the end face of the first tool.

4. An apparatus according to claim 1, wherein the third tool has a cylindrical end which is likewise arranged in the circularly cylindrical recess of the guide part and can be guided by the latter.

5. An apparatus according to claim 1, wherein the end of the third tool which presses onto the end face of the second tool remote from the die button shape has a conical shape, whereby the third tool forms an at least substantially linear contact with the end face of the second tool, with this line of contact being located at least predominantly to one side of the axis of symmetry and moving around the axis of symmetry on rotation of the third tool.

6. An apparatus according to claim 1, wherein the relative axial feed movement takes place by movement of the third tool towards the second tool and the fastener element.

7. An apparatus according to claim 1, wherein the third tool can not only be rotated about the axis of symmetry of the fastener element but rather also simultaneously about the inclined axis which is defined by the inclined position of the second tool.

8. An apparatus according to claim 1, wherein the cutout of the first tool which receives the fastener element is so dimensioned in comparison to the head part of the fastener element that the contact surface is set back below the end face of the first tool confronting the sheet metal part, whereby a receiving space for the conical rim region of the hole can be provided in the sheet metal part during the re-shaping of the rivet section.

9. An apparatus according to claim 8, wherein a ring-like receiving space for the rivet bead is formed in that the cutout merges via a conical surface into the said end face of the first tool.

10. An apparatus according to claim 9, wherein the included cone angle of the conical surface is smaller than that of the conical rim region of the sheet metal part.

11. An apparatus for the attachment to a sheet metal part (513), of a fastener element (512) comprising a head part (514) having a tubular rivet section which is disposed concentric to an axis of symmetry (518) of the fastener element or of a fastener section (520) of the fastener element and merges via a contact surface (522) extending in a radial direction into the head part (514), wherein a die button (502) is provided to hold the fastener element whose rivet section (516) projects out of the die button, wherein the sheet metal part (513) can be placed onto the rivet section (516) of the fastener element held in a die button (502); wherein a second tool is provided in the form of a rivet die button (502') having a die button shape for the beading over of the rivet section on the side of the sheet metal part remote from the rivet section coaxial to the axis of symmetry of the rivet section and within a guide (788); wherein a third tool (703) is provided on the end face of the second tool remote from the die button shape and is configured to exert a local force on the end face of the rivet die button (502') remote from the rivet section and to move this local force in circles around the central axis of symmetry (518); and wherein a device is provided to generate a relative axial feed movement (536) between the third tool (505) exerting the force and the die button (502), whereby the rivet section (516) can be pressed through the sheet metal part while forming a hole and can subsequently be beaded over and the sheet metal part (513) can be clamped in the region of the hole between the contact surface (522) and the beaded over rivet section (516').

12. An apparatus according to claim 1, wherein it is installed into a tool resembling a pillar drill (drill press) in order to achieve the relative movements.

13. An apparatus according to claim 11, wherein it is installed into a tool resembling a pillar drill (drill press) in order to achieve the relative movements.

* * * * *

UNITED STATES PATENT AND TRADEMARK OFFICE
CERTIFICATE OF CORRECTION

PATENT NO.         : 7,480,971 B2                                              Page 1 of 1
APPLICATION NO.  : 11/568249
DATED              : January 27, 2009
INVENTOR(S)        : Diehl et al.

It is certified that error appears in the above-identified patent and that said Letters Patent is hereby corrected as shown below:

On the Title Page item (12), "Oliver et al." should be changed to "Diehl et al."

On the Title Page item (75), "Diehl Oliver" should be changed to "Oliver Diehl"

Signed and Sealed this

Twenty-fourth Day of March, 2009

JOHN DOLL
*Acting Director of the United States Patent and Trademark Office*